(12) United States Patent
Fosbinder et al.

(10) Patent No.: US 7,199,331 B2
(45) Date of Patent: Apr. 3, 2007

(54) BACKUP CONTROL FOR WELDING-TYPE DEVICE REMOTE CONTROL AND METHOD OF USE

(75) Inventors: Daniel C. Fosbinder, Appleton, WI (US); Adam P. Laabs, Brillion, WI (US)

(73) Assignee: Illinois Tool Works Inc., Glenview, IL (US)

( * ) Notice: Subject to any disclaimer, the term of this patent is extended or adjusted under 35 U.S.C. 154(b) by 365 days.

(21) Appl. No.: 10/709,839

(22) Filed: Jun. 1, 2004

(65) Prior Publication Data

US 2005/0263512 A1   Dec. 1, 2005

(51) Int. Cl.
*B23K 9/10*    (2006.01)
(52) U.S. Cl. .................................................... 219/132
(58) Field of Classification Search ................ 219/132, 219/130.5, 130.01
See application file for complete search history.

(56) References Cited

U.S. PATENT DOCUMENTS 5,777,295 A * 7/1998 Kneisley et al. ............ 219/132
6,103,994 A * 8/2000 DeCoster et al. ........... 219/132

OTHER PUBLICATIONS

Miller Electric Mfg. Co., "Optima Owner's Manual," OM-2805C (pp. 1-26, Warranty, and Owner's Record), Oct. 2001.

* cited by examiner

*Primary Examiner*—Clifford C. Shaw
(74) *Attorney, Agent, or Firm*—Ziolkowski Patent Solutions Group, SC

(57) ABSTRACT

The present invention is directed to a welding-type power source controller includes an input configured to receive feedback regarding a remote control configured to control a welding-type process. The controller includes a processor configured to receive the feedback and override the remote control if a control irregularity is detected.

29 Claims, 2 Drawing Sheets

BACKUP CONTROL FOR WELDING-TYPE DEVICE REMOTE CONTROL AND METHOD OF USE

BACKGROUND OF INVENTION

The present invention relates generally to welding-type systems and welding-type power sources and, more particularly, to a welding-type system that includes a remote control and backup system for the remote control. The backup system is configured to monitor the remote control and override the remote control upon detecting an irregularity.

Many welding-type devices are adaptable to include a remote control. Particularly, when performing a Shielded Metal Arc Welding (SMAW) process, or a "stick" process, there sometimes is a need to control the output of the welding device with a remote control. Typically, the remote control directly controls the welding device or sends commands to control electronics within the welding device, which govern the operation of the welding device. Under either of these configurations, the welding device is set by way of a control panel located on the welding-type device or power source to a current greater than the intended output. By doing so, the remote control can control the output as a percentage of this current with relative accuracy.

During operation, the remote control typically assumes control of the welding device in one of two ways. That is, the remote control may be automatically sensed by the welding device whereby upon sensing the remote control, the welding device passes control from the front panel to the remote control. Alternatively, an operator may engage the remote control and manually select the remote control as the control means from the welding device.

However, while these systems are configured to adapt to planned configuration changes of adding or removing a remote control, the welding devices are typically not designed to adapt to unplanned control changes. That is, the welding devices are typically not configured to adapt to an unexpected removal of a remote control during the performance of a welding-type process. However, while the welding devices are not configured to adapt to unplanned removals of a remote control, such unplanned removals are not uncommon in some instances.

Specifically, many welding-type processes are performed within harsh environments and under harsh conditions. In these instances, the cable connecting the remote control to the welding device may fail. Furthermore, in industrial manufacturing facilities, the cable connecting the remote control to the welding device may be inadvertently cut or severed. Additionally, an operator error may accidentally disconnect the remote control from the welding device. In any case, depending on the particular configuration of the welding device and whether the connection to the remote control shorts or opens, the welding device can experience a number malfunctions.

Should the connection to the remote control open and the output of the welding device prematurely fall to zero, the welding surface may be severely damaged. On the other hand, should the connection to the remote control short, the welding device may default to the panel setting. In this case, an unexpected current surge will be supplied to the weld that may damage the welding surface. Additionally, should the connection to the remote control short to one of the other power leads within the cable, the output at the weld may exceed the panel setting and also damage the weld.

It would therefore be desirable to design a welding-type apparatus incorporating a remote control backup system to protect the welding-type apparatus and the workpiece from an inadvertent removal or malfunction of the remote control.

BRIEF DESCRIPTION OF INVENTION

The present invention is directed to a welding-type apparatus that overcomes the aforementioned drawbacks. Specifically, the present invention includes a controller configured to monitor operation of a remote control and assume operational control upon detecting a control irregularity. That is, the present invention includes a controller configured to monitor a remote control and assume control of a welding-type process upon detecting a malfunction of the remote control.

Therefore the present invention includes a welding-type power source controller is disclosed that includes an input configured to receive feedback of a remote control process of a welding-type process. The controller also includes a processor configured to receive the feedback and override the remote control process if a control irregularity is detected.

In accordance with another aspect of the present invention, a method of controlling a welding-type process is disclosed that includes remotely controlling a welding-type power source from a secondary control and monitoring performance of the remote controlling step. The method includes redirecting control of the welding-type power source to a primary control upon detecting a performance abnormality.

According to another aspect of the present invention, a welding-type apparatus is disclosed that includes a power source configured to deliver welding-type power to perform a welding-type process and a remote control configured to control an output of the welding-type power. A monitoring control is included that is configured to monitor the remote control and a backup control is configured to assume control of the welding-type process upon detection of a remote control malfunction.

In accordance with yet another aspect of the present invention, a welding-type apparatus is disclosed that includes means for controlling a welding-type apparatus and means for monitoring the remote means. Additionally, means for overriding the remote means upon detecting a control irregularity of the remote means is included.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The present invention is directed to a welding-type device and, more specifically, to a welding-type power source that includes a controller configured monitor operation of a remote control and assume operational control upon detecting a control irregularity. As one skilled in the art will fully appreciate, the hereinafter description of welding devices not only includes welders but also includes any system that requires high power outputs, such as heating and cutting systems that may benefit from such a remote control. Therefore, the present invention is equivalently applicable with any device requiring high power output, including welders, plasma cutters, induction heaters, and the like. Reference to welding power, welding-type power sources, or welders generally, includes welding, cutting, or heating power. Description of a welding apparatus illustrates just one embodiment in which the present invention may be implemented. The present invention is equivalently applicable with systems such as cutting and induction heating systems.

Figure 1:
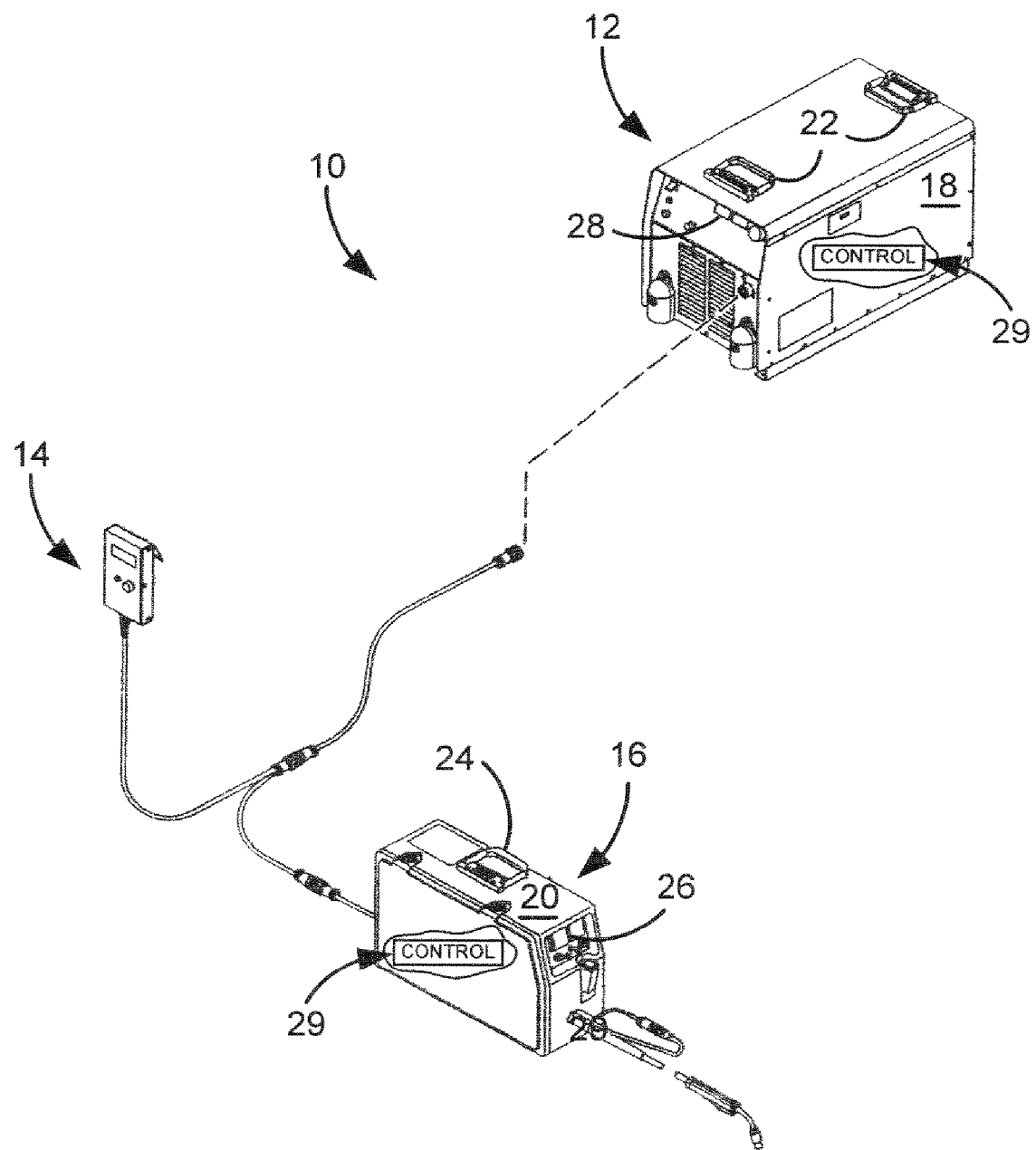
FIG. 1 is a perspective view of a welding-type apparatus incorporating the present invention.

FIG. 1 shows a welding-type system 10. The welding-type system 10 includes three primary components. That is, the welding-type system 10 includes a power source 12, a remote control 14, and a welding-type device 16. The power source 12 may receive power from a transmission power receptacle (not shown), whereby the power received via the transmission power receptacle is converted by the power source 12 to a welding-type power to perform a welding-type process. It is also contemplated that the power source 12 may be an engine driven power source incorporating a combustion engine and generator, whereby the raw power generated by the engine driven generator is converted to welding-type power. Furthermore, it is contemplated that the welding-type power source 12 and the welding-type device 16 may be combined, thereby forming a single welding-type device controlled by the remote control 14. The power source 12 and welding-type device 16 include housings 18, 20 which enclose the internal components. Optionally, the power source 12 and the welding-type device 16 may include handles 22, 24 or a loading eyehook to facilitate portability.

Prior to initiating a welding-type process, an operator inputs desired operational constraints at a primary control, specifically, a control panel 26 of the welding-type device 28. For example, the operator may select a welding-type process to be performed and the desired output parameters of the welding-type process. Alternatively, should the welding system configuration include a stand-alone power source, such as welding-type power source 12, the welding-type power source 12 may serve as the primary control. In this case, the operator may enter the operational constraints at a control panel 28 of the welding-type power source 12. In accordance with a preferred embodiment, the operational constraints, entered at the primary control panel 26 or 28, include an output current setting that is slightly greater than the welding device 28 is intended to output. Once the operational constraints are entered, the operator may utilize a secondary control or the remote control 14 to control the output of the welding-device 28 as a percentage of current selected upon entering the operational constraints.

A monitoring system or control 29 is disposed within the housing 20 of the welding-type device 16 as shown in the broken away portion of the housing 20. Additionally, should a stand-alone welding-type power source 12 be utilized, the monitoring system or control 29 may be disposed within the housing 18 of the welding-type power source 12 as shown in the broken away portion of the housing 18. Once the remote control 14 assumes control of the output for the welding-type process, the monitoring system or controller 29 monitors control commands sent by the remote control 14, thereby automatically monitoring the remote control 14. As will be described in detail with respect to FIG. 2 the monitoring system keeps track of the performance of the remote control 14 by determining whether signals from the remote control change too rapidly for "normal" operating conditions. As will be described, should an irregularity be detected from the remote control 14, the monitoring system locks out the remote control 14 and defaults the output of the welding-type device to the operational constraints entered at the outset by the operator at the primary control. As such, the welding-type process may be successfully completed based upon the constraints entered at the primary control despite any malfunction by the remote control 14.

Figure 2:
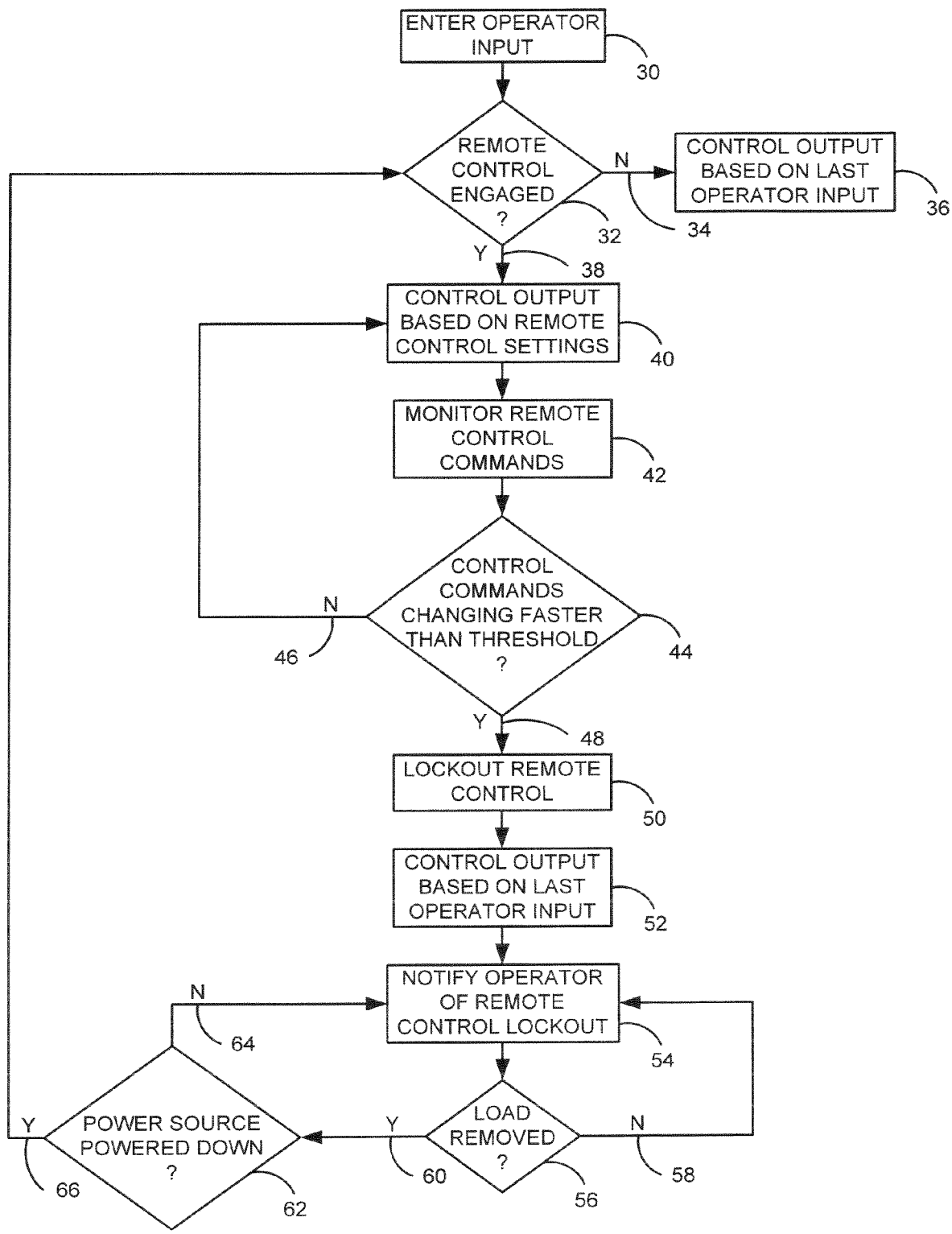
FIG. 2 is a flow chart illustrating a control technique in accordance with one embodiment of the invention.

Referring to FIG. 2, a flow chart is shown illustrating the steps of a monitoring and acts of a control technique according to the present invention. The technique starts following operator input 30 of operational constraints. Once the operator has completed input 30 of the desired operational constraints, the monitoring processor checks to determine whether a remote control is engaged 32. It is contemplated that the monitoring system includes a monitoring processor configuration that is disposed within the welding-device 16 of FIG. 1 or, if present, that may be disposed within the welding-type power source 12. Additionally, it is contemplated that redundant processor configurations may be utilized whereby monitoring processor configurations are disposed within the welding-type power source 12 and welding-type device 16.

Referring again to FIG. 2, if a remote control is not present 34, the desired welding-type process is initiated based on the operator's last input of operational constraints 36 at the primary control. Specifically, the welding-type process is initiated based upon the operator's manual input of operating constraints 30, 36 via the front panel of the device, as described with respect to FIG. 1.

On the other hand, should a remote control be detected as operationally engaged 38, control is passed to the remote control and the output of the welding-type process is controlled based on the control commands received from the remote control 40. Upon passing control to the remote control 40, the monitoring processor configuration continuously monitors the remote control 42 to determine whether the control commands received from the remote control are changing at a rate that exceeds a threshold 44.

The threshold is selected such that a rate of change in control commands that exceeds the threshold is indicative of an irregularity or malfunction of the remote control that signifies a control abnormality with a potential to adversely affect the welding-type process. As such, as long as the rate of change of the control commands remains less that the threshold 46, control remains vested with the remote control and the welding-type process continues to be controlled based upon control commands received from the remote control 40.

However, should the rate of change of the control commands exceed the threshold 48, a control irregularity, abnormality, or malfunction has been detected with the potential to adversely affect the welding-type process being performed. Control of the welding-type process is then removed from remote control by way of a remote control lockout 50. That is, upon detecting that control commands exceed the threshold 48, the monitoring system locks out the remote control 50.

Simultaneously with initiating the lockout 50, the monitoring system passes control to the primary control, typically the welding-type device or welding-type power source, which assumes control of the output of the welding-type process 52. The primary control serves as a backup control and continues the welding-type process according to the last operator input 52. Also, substantially simultaneously with initiating the lockout 50 and redirecting control of the welding-type process 52, the monitoring system sends a notification to the operator by way of the front panel of the welding-type device or power source. This notification informs the operator that the remote control has been locked out and that control of the welding-type process 54 has been assumed by the primary control, or reverted to the primary control.

Once the monitoring system initiates the lockout 50 and redirects control of the welding-type process 52, and the operator is notified of the remote control malfunction 54, the monitoring system continuously checks to determine whether the load has been removed 56. While the load remains in place 58, the welding-type process continues under the control of the primary control and notification of the remote control malfunction and lockout is continued 54. Once the load is removed 60, the monitoring system waits for the power source to be powered down 62. If the power down is not immediate 64, operator notification of the remote control malfunction and lockout is continued 54. However, once power down has been detected 66, the monitoring system is reset and a check for a re-engaged or re-established remote control is made 32.

Therefore, the above-described system enables accurate control of a welding-type process in the event of a remote control malfunction or removal. A monitoring system continuously reviews the operation of the remote control to redirect control from the remote control to a primary control upon detecting an irregularity in the control commands sent by the remote control. As such, the primary control functions as a backup control and conditions resulting from a remote control malfunction or removal that could be potentially detrimental to a desired welding-type process are averted.

It is contemplated that the present invention may be utilized with a plurality of welding-type process. For example, the welding-type apparatus may operate according to a Gas Metal Arc Welding (GMAW) welding-type process, formerly known as Metal Inert Gas (MIG) process, a Tungsten Inert Gas (TIG) welding-type process, a Shielded Metal Arc Welding (SMAW) process, an induction heating process, a plasma-cutting process or other welding-type processes.

In accordance with one embodiment of the present invention, a welding-type power source controller includes an input configured to receive feedback of a remote control process of a welding-type process. The controller also includes a processor configured to receive the feedback and override the remote control process if a control irregularity is detected.

In accordance with another embodiment of the invention, a method of controlling a welding-type process includes remotely controlling a welding-type power source from a secondary control and monitoring performance of the remote controlling step. The method includes redirecting control of the welding-type power source to a primary control upon detecting a performance abnormality.

According to another embodiment of the present invention, a welding-type apparatus is disclosed that includes a power source configured to deliver welding-type power to perform a welding-type process and a remote control configured to control an output of the welding-type power. A monitoring control is included that is configured to monitor the remote control and a backup control is configured to assume control of the welding-type process upon detection of a remote control malfunction.

In accordance with yet another embodiment of the invention, a welding-type apparatus is disclosed that includes means for controlling a welding-type apparatus and means for monitoring the remote means. Additionally, means for overriding the remote means upon detecting a control irregularity of the remote means is included.

The present invention has been described in terms of the preferred embodiment, and it is recognized that equivalents, alternatives, and modifications, aside from those expressly stated, are possible and within the scope of the appending claims.

What is claimed is:

1. A welding-type power source controller comprising:
   an input configured to receive feedback of a remote control process of a welding-type process; and
   a processor configured to first ensure a remote control is operationally engaged and then continue to receive the feedback and override the remote control process if a control irregularity is detected.

2. The controller of claim 1 wherein the processor is configured to monitor the feedback to detect a rate of change in control commands for the remote control process indicative of an irregularity.

3. The controller of claim 2 wherein the rate of change in control commands indicative of an irregularity includes a rate of change indicative of at least one of a corrupt communication from the remote control, a disconnection of the remote control, and a communications failure from the remote control.

4. The controller of claim 2 wherein the processor is further configured to compare the rate of change of the control commands to a threshold to determine whether the rate of change exceeds a tolerance.

5. The controller of claim 1 wherein the remote control process includes a remote control in communication with a welding-type apparatus and the processor is further configured to notify an operator that the remote control is locked-out upon detecting an irregularity.

6. The controller of claim 1 wherein the processor is further configured to divert control of the welding-type process to a backup controller configured to control the welding-type process according to a last operator control input upon detection of an irregularity.

7. The controller of claim 6 wherein the processor is configured cause the backup controller to control the welding-type process until the welding-type process is discontinued.

8. The controller of claim 1 wherein the welding-type power source controller is configured to be incorporated into a welding-type power source.

9. The controller of claim 1 wherein the welding-type power source controller is configured to be incorporated into a portable welding-type device.

10. A method of controlling a welding-type process comprising:
    remotely controlling a welding-type power source from a secondary control;
    monitoring performance of the remote controlling; and
    redirecting control of the welding-type power source to a primary control upon detecting a performance abnormality.

11. The method of claim 10 further comprising determining whether control commands sent from the remote control are indicative of a performance abnormality.

12. The method of claim 10 further comprising disregarding input from the remote control, upon detecting a performance abnormality of the remote control.

13. The method of claim 10 further comprising controlling the welding-type power source according to a previous user input upon detecting a performance abnormality.

14. The method of claim 10 further comprising notifying a user of a remote control failure upon detecting a performance abnormality.

15. The method of claim 10 further comprising locking-out the remote control upon detecting a performance abnormality.

16. The method of claim 15 further comprising removing the lockout only upon powering down the welding-type power source.

17. A welding-type apparatus comprising:
- a power source configured to deliver welding-type power to perform a welding-type process;
- a remote control configured to control an output of the welding-type power;
- a monitoring control configured to monitor the remote control; and
- a backup control configured to assume control of the welding-type process upon detection of a remote control malfunction.

18. The apparatus of claim 17 wherein detecting a remote control malfunction includes detecting commands from the remote control including a rate of change of the control commands that is at least one of greater than a maximum threshold and less than a minimum threshold.

19. The apparatus of claim 17 wherein the backup control is configured to control the output of the welding-type power source according to an operator constraint upon assuming control.

20. The apparatus of claim 19 wherein the backup control is configured to control the welding-type power source according to the operator constraint until the welding-type process is discontinued.

21. The apparatus of claim 17 wherein the monitoring control is further configured to place the welding-type power source into a lockout mode upon detecting a remote control malfunction.

22. The apparatus of claim 21 wherein the monitoring control is further configured to hold the welding-type power source in the lockout mode until the welding-type power source is powered down.

23. The apparatus of claim 17 wherein the backup control is configured to be incorporated into the power source.

24. The apparatus of claim 17 wherein the welding-type power source is configured to deliver welding-type power for at least one of a metal inert gas (MIG) welding-type process, tungsten inert gas (TIG) welding-type process, a shielded metal arc welding (SMAW) welding-type process, an induction heating process, and a plasma-cutting process.

25. The apparatus of claim 17 wherein the backup control includes a primary control operating as a backup control.

26. A welding-type apparatus comprising:
- remote means for controlling a welding-type apparatus;
- means for monitoring the remote means; and
- means for overriding the remote means upon detecting a control irregularity of the remote means.

27. A welding-type power source controller comprising:
- an input configured to receive feedback of a remote control process of a welding-type process; and
- a processor configured to receive the feedback and override the remote control process if a control irregularity is detected; and
- wherein the processor is further configured to monitor the feedback to detect a rate of change in control commands for the remote control process indicative of an irregularity.

28. The controller of claim 27 wherein the rate of change in control commands indicative of an irregularity includes a rate of change indicative of at least one of a corrupt communication from the remote control, a disconnection of the remote control, and a communications failure from the remote control.

29. The controller of claim 28 wherein the processor is further configured to compare the rate of change of the control commands to a threshold to determine whether the rate of change exceeds a tolerance.

* * * * *